(12) United States Patent
Farnham et al.

(10) Patent No.: US 7,496,582 B2
(45) Date of Patent: Feb. 24, 2009

(54) IDENTIFICATION OF RELATIONSHIPS IN AN ENVIRONMENT

(75) Inventors: Shelly D. Farnham, Seattle, WA (US);
William L. Portnoy, Seattle, WA (US);
Lili Cheng, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 481 days.

(21) Appl. No.: 10/749,870

(22) Filed: Dec. 31, 2003

(65) Prior Publication Data

US 2005/0165715 A1 Jul. 28, 2005
US 2007/0168314 A9 Jul. 19, 2007

Related U.S. Application Data

(63) Continuation-in-part of application No. 10/164,898, filed on Jun. 4, 2002, now Pat. No. 7,167,910.

(60) Provisional application No. 60/359,023, filed on Feb. 20, 2002.

(51) Int. Cl.
G06F 17/30 (2006.01)

(52) U.S. Cl. .................. 707/100; 707/2; 707/102

(58) Field of Classification Search .......... 707/1–3, 707/10, 100–103, 104.1, 9
See application file for complete search history.

(56) References Cited

U.S. PATENT DOCUMENTS 5,515,488 A * 5/1996 Hoppe et al. .......... 345/440
6,486,898 B1 * 11/2002 Martino et al. .......... 715/853
6,832,245 B1 * 12/2004 Isaacs et al. ............ 709/206
2003/0158897 A1 * 8/2003 Ben-Natan et al. ...... 709/204
2003/0167324 A1 * 9/2003 Farnham et al. ........ 709/224
2005/0086238 A1 * 4/2005 Nevin, III ............... 707/100

OTHER PUBLICATIONS

Galegher, Jolene et al., "Intellectual Teamwork: Social and Technological Foundations of Cooperative Work," Lawrence Erlbaum Associates, Publishers, Hillsdale, NJ, 1990.
Aldenderfer, M. et al., "Cluster Analysis," Iowa City: Sage Publications, 1974.
Card, S. et al., "Readings in Information Visualization: Using Vision to Think," San Francisco: Morgan Kaufmann Publishers, 1999.
Eick, Stephen G. et al., "Navigating Large Networks with Hierarchies," Journal of Systems and Software. 1993, pp. 204-210.
Stewart, Thomas A., "Intellectual Capital: The New Wealth of Organizations," Doubleday, New York, NY, 1997.

(Continued)

Primary Examiner—Cheryl Lewis
(74) Attorney, Agent, or Firm—Lee & Hayes, PLLC

(57) ABSTRACT

A method identifies components associated with a first end point in an environment, such as a social environment. The method further identifies components associated with a second end point in the environment. A determination is made regarding whether any of the identified components are associated with both the first end point and the second end point. The method then displays relationships between the first end point, the second end point, and any components associated with both the first end point and the second end point.

24 Claims, 8 Drawing Sheets

OTHER PUBLICATIONS

Wasserman, Stanley et al., "Social Network Analysis: Methods and Applications," Cambridge University Press, Cambridge, UK, 1994.

Kautz, Henry et al., "Referral Web: Combining Social Networks and Collaborative Filtering," Communications of the ACM, Mar. 1997, vol. 40, No. 3, pp. 63-65.

Nardi, Bonnie A. et al., "Integrating Communication and Information Through ContactMap," Communications of the ACM, Apr. 2002, vol. 45, No. 4, pp. 89-95.

Kamada, Tomihisa et al., "An Algorithm for Drawing General Undirected Graphs," Information Processing Letters 31 (1989), pp. 7-15.

"Augmenting Organizational Memory: A field study of answer garden", Ackerman, M., ACM Transactions on Information Systems, 1998, vol. 16, No. 3, 32 pages.

"Knowledge Management Systems: Issues, Challenges, and Benefits", Alavi et al., Communications of AIS, vol. 1, 1999, 20 pages.

"Visualizing Conversation", Donath et al., IEEE Proceedings of HICSS-32, 1999, 16 pages.

"Turning Information into Knowledge: Information Finding as a Collaborative Activity", Digital Libraries, 1994, 12 pages.

"Social Translucence: An Approach to Designing Systems that Support Social Processes", Erickson et al., ACM Transactions on Computer-Human Interaction, vol. 7, No. 1, 22 pages. 2000.

"Visualizing Social Networks", Journal of Social Structure, 2000, 20 pages.

"Recommending Collaboration with Social Networks: A Comparative Evaluation", McDonald, D., Proceedings of the 2003 ACM Conference on Human Factors in Computing Systems, Apr. 2003, 18 pages.

"Expertise Recommender: A Flexible Recommendation System and Architecture", McDonald et al., Proceedings of the 2000 ACM Conference on Computer Supported Cooperative Work, Dec. 2000, 10 pages.

"It's not what you know, It's who you know: Work in the Information Age", Nardi et al., First Monday, vol. 5, No. 5, 36 pages. May 2000.

"Discourse Diagrams: Interface Design for Very Large-Scale Conversations", Sack, W., IEEE Proceedings of HICSS-33, 2000, 10 pages.

"Visualization Components for Persistent Conversations", Smith et al., Proceedings of CHI, 2001, 8 pages.

* cited by examiner

IDENTIFICATION OF RELATIONSHIPS IN AN ENVIRONMENT

This application is a continuation-in-part (CIP) of and claims priority to U.S. patent application Ser. No. 10/164, 898, U.S. Pat. No. 7,167,910 (U.S. Patent Publication No. 2003/0167324), filed Jun. 4, 2002, which claims the benefit of U.S. Provisional Application No. 60/359,023, filed Feb. 20, 2002.

TECHNICAL FIELD

The systems and methods described herein relate to identifying one or more relationships between two points in an environment, such as a social environment.

BACKGROUND

Computer systems are continuing to grow in popularity and are frequently interconnected with other computer systems via networks, such as local area networks (LANs) and the Internet. Features such as electronic mail (email), instant messaging, and project collaboration encourage the use of computer systems coupled to networks. These features allow users to, for example, communicate with other users, retrieve information, and share common documents.

In some situations, a user may need to interact with an unfamiliar person, an unfamiliar department, or an unfamiliar group. In other situations, a user may desire to learn how another person, department, or group is related to the user. For example, a user may want to talk to another person in an organization, but has never been introduced to that other person. In this situation, the user would like to know if there is a common person or a common group with which both the user and the other person are associated. In another example, a user may want to learn about a particular project, but doesn't know if they have any relationship to the project.

Attempting to discover these types of relationships manually is time-consuming and inefficient. For example, if a user asks a large group of people whether they know a particular person, that user spends a great deal of their time communicating with these people, and takes time away from each person that is contacted. Further, attempting to manually search through various organizational charts, mailing lists, and other information to discover a relationship between two people (or between a person and a group) is time-consuming and may not accurately discover all relationships.

It would be desirable to provide an improved approach to identifying one or more relationships between two points in an environment.

SUMMARY

The systems and methods described herein identify and display relationships between points in an environment. In a particular embodiment, a method identifies components associated with a first end point in an environment and identifies components associated with a second end point in an environment. A determination is made regarding whether any of the identified components are associated with both the first end point and the second end point. A display is generated that shows relationships between the first end point, the second end point, and any components associated with both the first end point and the second end point.

BRIEF DESCRIPTION OF THE DRAWINGS

Similar reference numbers are used throughout the figures to reference like components and/or features.

DETAILED DESCRIPTION

The systems and methods discussed herein identify and display one or more relationships between two points in an environment, such as a social environment. Social information is modeled according to a computer networking approach. Users are provided information in a graphical form representing, for example, relationships and patterns in their social spaces or social networks. The systems and methods discussed herein analyzes relationships associated with two end points (e.g., users) to identify one or more common relationships between the two end points. These common relationships may include common people or common groups that "connect" the two end points within an environment, such as a corporate environment. Relationships can be identified by analyzing organizational charts, group information, mailing lists, and the like.

As used herein, the term "component" may include a person, a project, a group of persons, a department, an entity, an association, and the like. A component may also be referred to as a "node" or a "point". An "end point" can be any component, such as a person, a group, a project, or a department. As used herein, the terms "environment", "computing environment", "corporate environment", "social environment", and "social network" are used interchangeably. As used herein, a "mailing list" may also be referred to as a "distribution list".

Figure 1:
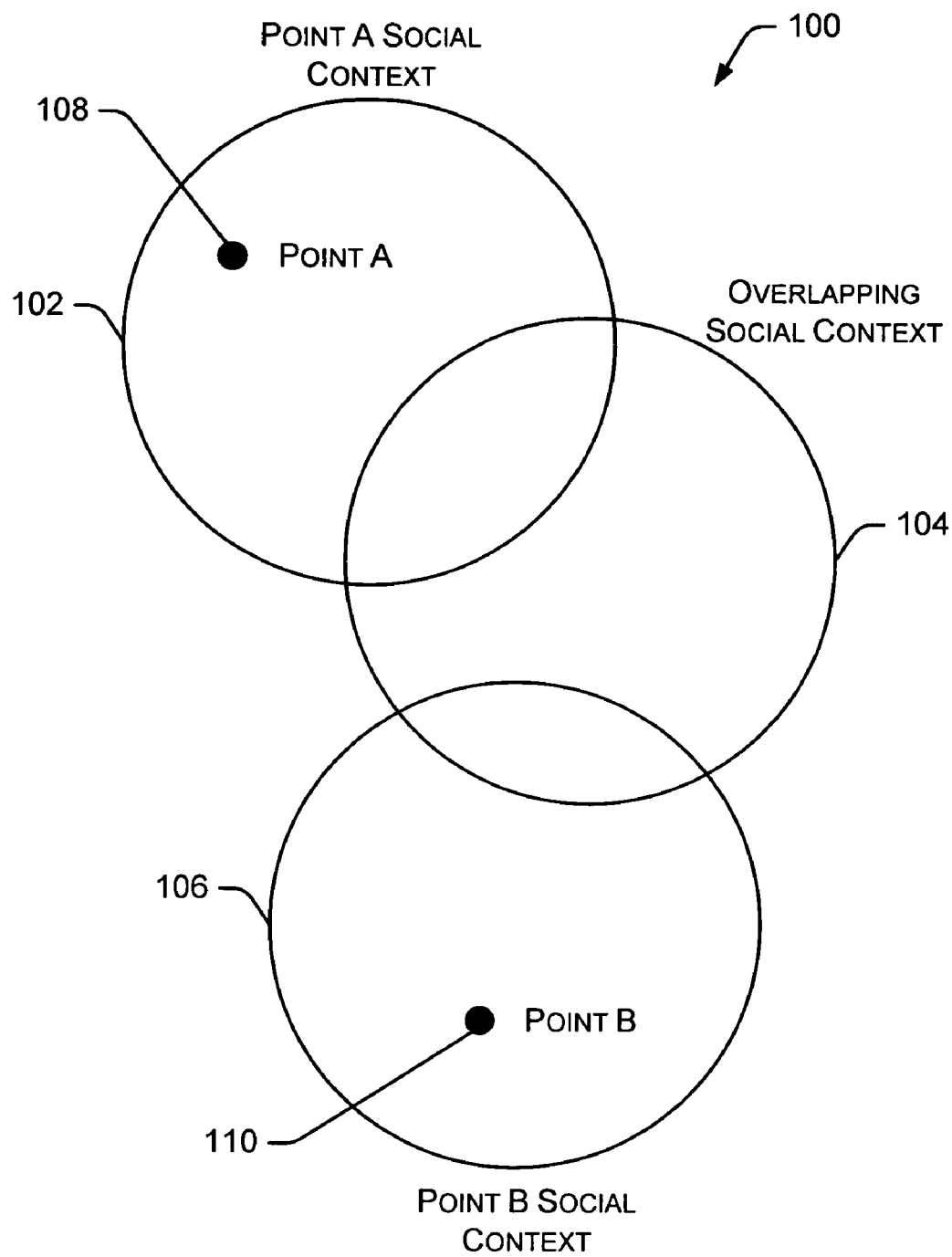
FIG. 1 illustrates an example environment containing various social contexts and points within those contexts.

FIG. 1 illustrates an example environment 100 containing various social contexts and points within those contexts. Environment 100 may also be referred to as a "social environment" or a "social network". A first social context 102 is labeled "Point A Social Context" and a second social context 106 is labeled "Point B Social Context". Another social context 104 overlaps a portion of social contexts 102 and 106, and is labeled "Overlapping Social Context". A particular social context includes any number of components, such as users that are related to one another and groups or departments associated with those users. For example, a social context associated with a particular user may include other individuals with which the particular user is associated, such as friends, co-workers, other members of common groups or clubs, and other members of common mailing lists. In another example, a social context associated with a particular project may include other components associated with that project, such as employees assigned to the project, persons managing the project, related projects, and other entities or organizations related to the project. An example overlapping social context contains one or more components that are common to the two overlapped social contexts, such as a common person or a common project. A particular social context, including an overlapping social context, may contain any number of components.

In the example of FIG. 1, social context 102 includes "Point A" identified by reference number 108. Thus, social context 102 is the social context associated with Point A and labeled "Point A Social Context". Additionally, social context 106 includes "Point B" identified by reference number 110. Thus, social context 106 is the social context associated with Point B and labeled "Point B Social Context". Overlapping social context 104 includes one or more components that are common to both Point A Social Context 102 and Point B Social Context 106. Overlapping social context 104 may also include additional components that are not common to both Point A Social Context 102 and Point B Social Context 106. Additional details regarding social contexts are provided below.

Figure 2:
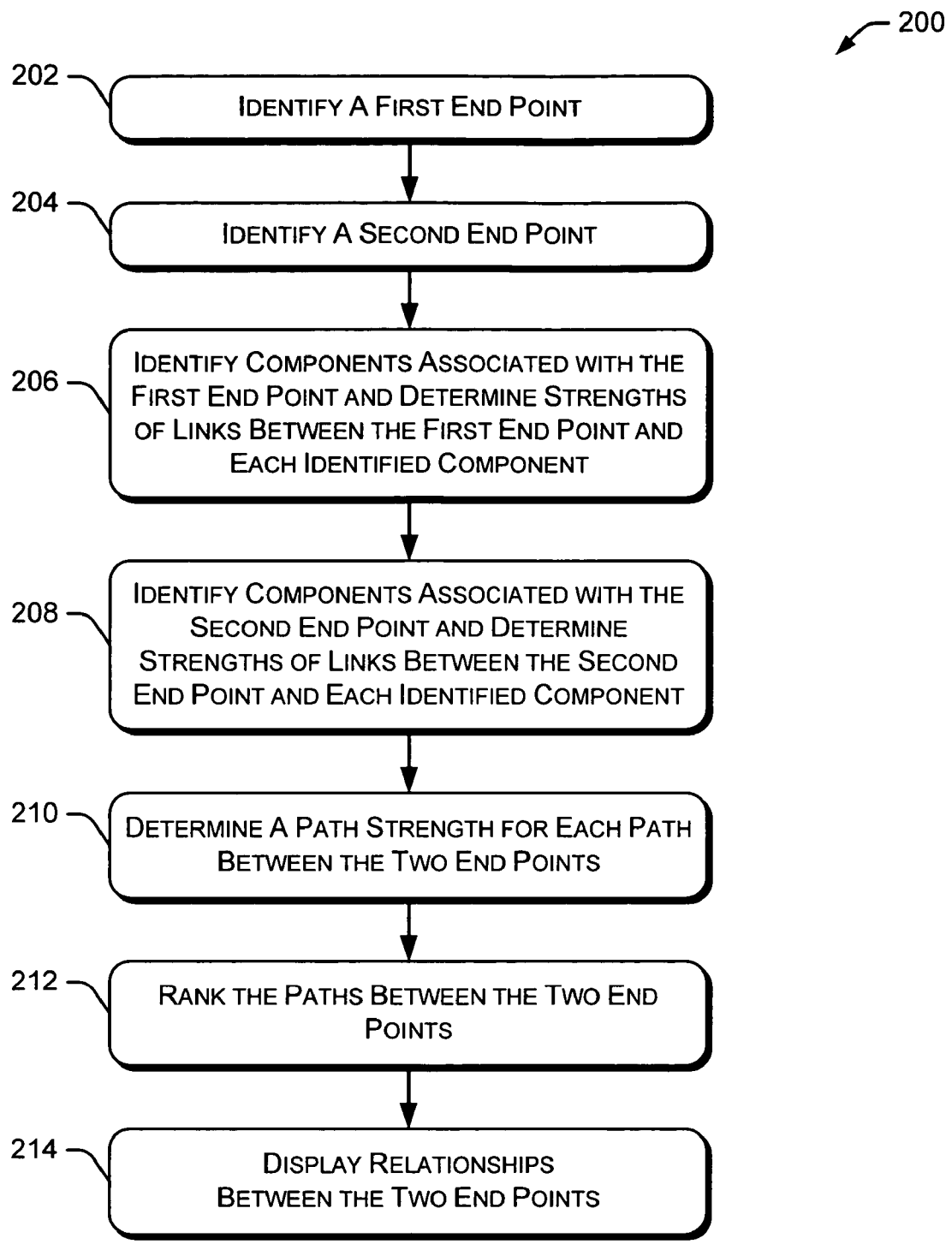
FIG. 2 is a flow diagram illustrating an embodiment of a procedure for identifying one or more relationships between two points in an environment.

FIG. 2 is a flow diagram illustrating an embodiment of a procedure 200 for identifying one or more relationships between two points in an environment, such as a social environment. Initially, a first end point is identified (block 202) along with a second end point (block 204). For example, the first end point and the second end point may be identified by a user desiring to learn of relationships between the two end points. These end points may be users, groups of users, projects, or other components. The two end points may be different types of components, such as a user and a project, or a project and a department.

Procedure 200 continues by identifying components associated with the first end point (block 206). This identification can be performed, for example, by analyzing organizational charts to identify associated employees (e.g., managers or other employees in the same department), mailing lists to identify associated individuals, personal profiles, organization membership lists, project participant lists, club lists, group lists, email address books, and the like. For each identified component, the procedure determines strengths of links between the identified component and the first end point. The procedure also identifies components associated with the second end point (block 208). This identification can be performed, for example, by analyzing any of the items discussed above with respect to identifying components associated with the first end point. For each identified component, the procedure determines strengths of links between the identified component and the second end point.

The procedure then determines a path strength for each path between the two end points (block 210). A path between two end points may include any number of components and any number of links between those components. In a particular embodiment, any path that does not have a minimum path strength is ignored or discarded. This minimum path strength threshold may be established by a network administrator or other user.

In a particular embodiment, the path strength for each path between the two end points is determined by first identifying the strength of each link between the two end points (e.g., the strength of the link between the first end point and a common component, and the strength of the link between the common component and the second end point). The strength of a particular link is rated between 0.0 and 1.0, where 0.0 indicates no relationship between the two components (i.e., the two components at opposite ends of the link) and 1.0 indicates a strong relationship between the two components. Various procedures can be used to determine the strength of a particular link. For example, a link's strength may increase if the two components are identified on multiple group lists, mailing lists, etc. Additionally, a link's strength may increase if the two components are contained in one or more lists and those lists are relatively short (signifying a stronger relationship among members of the shorter list). In one embodiment, mailing lists, group lists, or other lists having more than a particular number of members (e.g., more than 100 members) are ignored for purposes of identifying relationships between two components. Another example of calculating the strength of links between components is described in U.S. patent application Publication No. US 2003/0167324 A1, published Sep. 4, 2003, entitled "Social Mapping of Contacts from Computer Communication Information".

In certain embodiments, the strength of the links are normalized based on the number of mailing lists, group lists, or other lists in which each component is a member separately, such that the link strength is smaller if the components are each in a large number of lists.

The strengths of the links between the two end points are multiplied together to obtain a path strength. For example, if a particular path between two end points has two links, one with a link strength of 0.25 and the other with a link strength of 0.80, the resulting path strength is 0.20 (0.25×0.80).

Any path that contains at least one link with a strength of zero will have a path strength of zero, indicating that there is no common relationship between the two components at opposite ends of the path. Similarly, any link having a strength of zero indicates that there is no relationship between the components at opposite ends of the link.

The path strength provides an indicator of a relationship between two components. For example, if a common component is strongly associated with both a first end point and a second end point, that path will have a relatively high path strength. Examples of strong paths include 1) the situation where the common component is listed on the same mailing list as the two end points and the mailing list is relatively short, and 2) the situation where both end points are individuals that report to the same manager and the manager is the common component.

The procedure continues by ranking the paths between the first end point and the second end point (block 212). This ranking of paths may be based on the path strengths or other information. Finally, the relationships between the two end points are displayed graphically to a user (block 214), such as a user desiring to learn of relationships between the two end points. The relationships between the two end points may include one or more links (e.g., connecting lines) that represent relationships between the components at each end of the link. For example, a link is displayed between two people that work in the same department or are listed in a common mailing list. Additionally, links may be established between a group and each member of that group that is included in the graphical display. Additional details regarding the display of the relationships are provided below with reference to FIG. 3. In certain embodiments, only the strongest paths between two endpoints are displayed, such as the three strongest paths or the five strongest paths. These embodiments prevent the display of common components (and associated links) that are part of paths with low path strengths. In alternate embodiments, instead of displaying the relationships between the two end points, information regarding those relationships is used in another process, such as filtering search results or generating a report.

Figure 3:
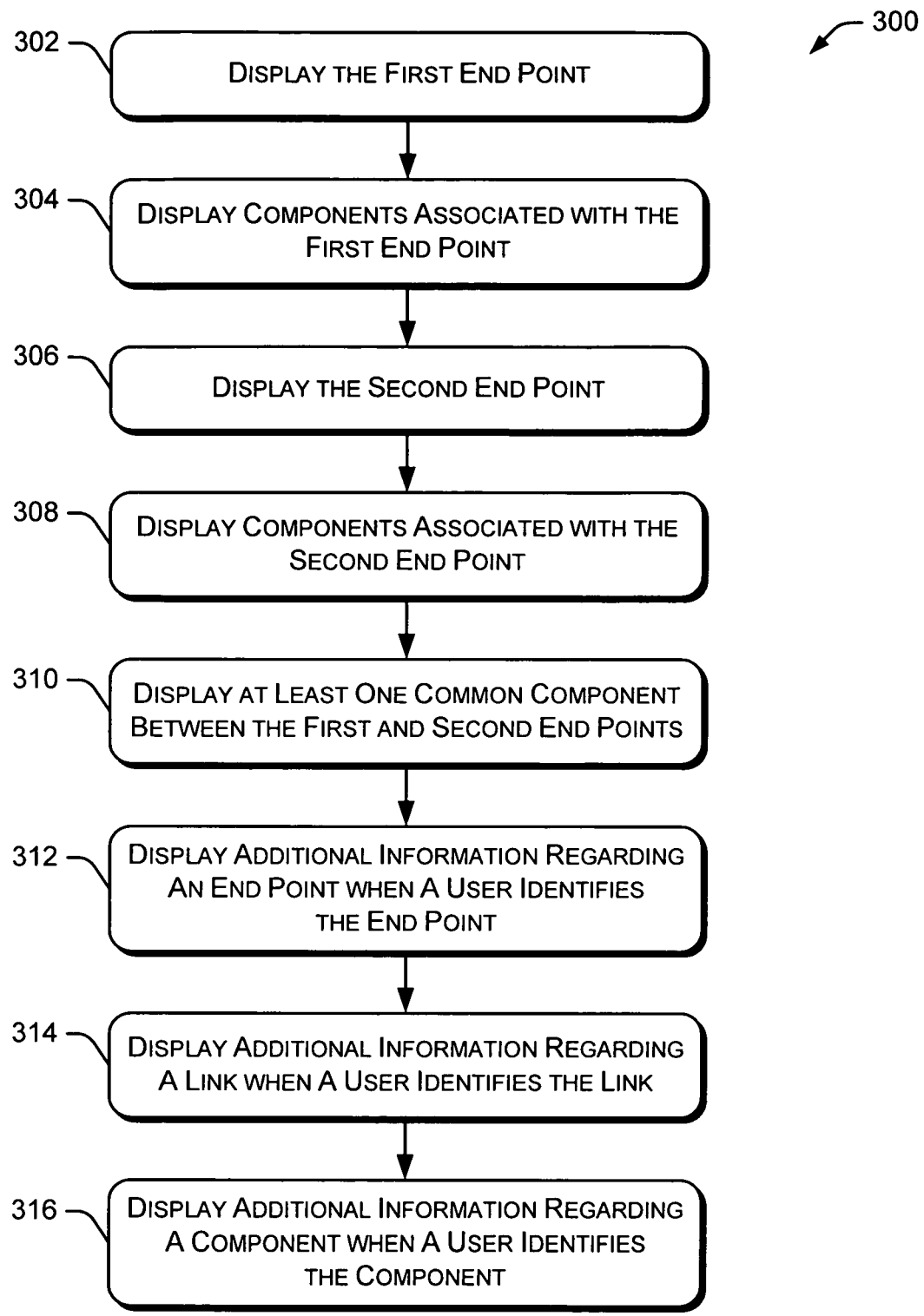
FIG. 3 is a flow diagram illustrating an embodiment of a procedure for displaying one or more relationships associated with points in an environment.

FIG. 3 is a flow diagram illustrating an embodiment of a procedure 300 for displaying one or more relationships associated with points (e.g., end points) in an environment, such as a social environment. Initially, the procedure displays the first end point (block 302) as well as components associated with the first end is point (block 304). Procedure 300 continues by displaying the second end point (block 306) and displaying components associated with the second end point (block 308). These components were previously identified, for example, in the procedure of FIG. 2 discussed above.

At block 310, at least one common component between the first and second end points is displayed. Additionally, some or all of the links or paths associated with the common component are displayed (e.g., the link between the first end point and the component, and the link between the second end point and the component). The number of common components displayed may vary depending on the total number of common components identified and any configuration information associated with the system displaying the components. For example, an administrator or other user may limit the display of common components to the one or two common components having the strongest path between the two end points. Additionally, some of the links or paths associated with the common component may not be displayed. For example, links associated with the common component that are not associated with one of the end points may not be displayed. By reducing the number of displayed links, the display is simplified and focuses attention on links that are related to one or both of the end points.

Procedure 300 continues by displaying additional information regarding an end point when a user identifies the end point (block 312). A user can identify an end point by moving a cursor or pointer over the end point (e.g., "mousing over" the end point), or otherwise selecting a particular end point in the display. For example, when a user moves a cursor over a particular end point, a window, pane, tool tip, or other display element is added to the display (e.g., overlayed on the existing graphical display) and contains additional information about the particular end point. This additional information is typically displayed temporarily for a predetermined time or until the user moves the cursor or pointer away from the identified end point. For example, if the identified end point is a person, the additional information displayed regarding the person may include the person's full name, a department in which the person works, groups to which the person belongs, the person's telephone number and email address, and the location of the person's office. In another embodiment, if the identified end point is a group, the additional information displayed regarding the group may include members of the group, a primary contact person for the group, a schedule of upcoming group activities, and other groups associated with the particular group. Alternatively, any type of information regarding an end point may be displayed when a user identifies the end point.

At block 314, additional information is displayed regarding a link when a user identifies the link. A user can identify a link by moving a cursor or pointer over the link, or otherwise selecting a link shown in the display. This additional information is typically displayed temporarily for a predetermined time or until the user moves the cursor or pointer away from the identified link. For example, if the identified link is a link between two people, the additional information displayed regarding the link may include information regarding the two people associated with the link, the relationship between the two people (e.g., person A manages person B), and common groups with which both people are associated. Alternatively, any type of information regarding a link may be displayed when a user identifies the link.

At block 316, additional information is displayed regarding any other component identified by a user. As discussed above, this additional information may be displayed temporarily in a window, pane, tool tip, or other display element. For example, a user may identify a person in the display that is not an end point, a group or department in the display that is not an end point, or any other component contained in the graphical display. If the identified component is a person, additional information includes, for example, information regarding the person such as name, email address, groups with which the person is associated, and the like. In another example, if the component is a group, the additional information can include members of the group, other related groups, a manager of the group, and the like. In other embodiments, any type of information can be displayed in response to a user identifying other types of components.

Figure 4:
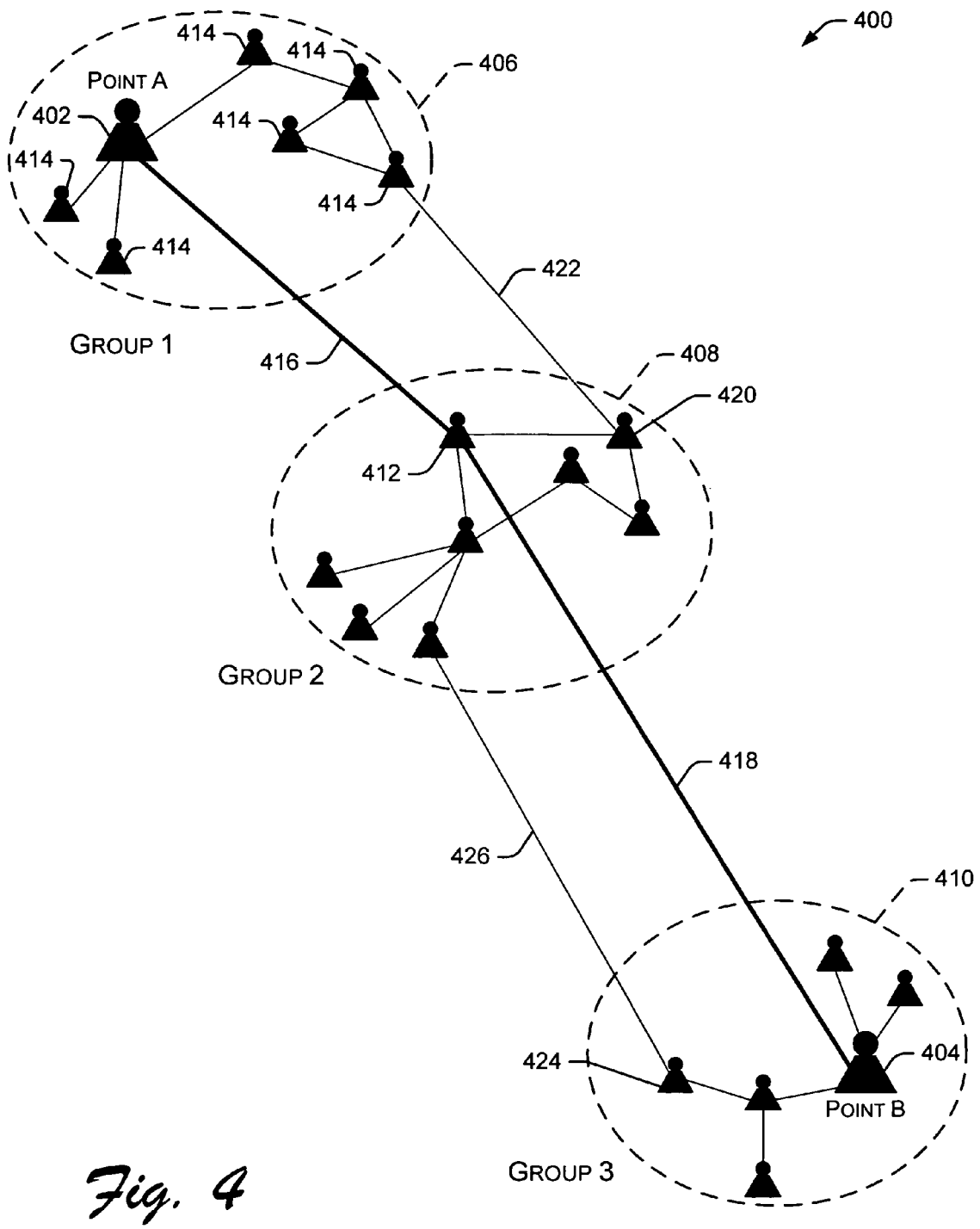
FIG. 4 illustrates an example graphical display of information related to multiple points in a social environment.

FIG. 4 illustrates an example graphical display of information 400 related to multiple points in a social environment. The example of FIG. 4 includes two endpoints—Point A, identified by reference number 402, and Point B, identified by reference number 404. In this example, a user indicated a desire to learn of relationships between Point A and Point B. In one embodiment, the graphical display of information 400 is generated using the procedure discussed above with respect to FIG. 3.

Point A has an associated social context identified by broken line 406. This social context identifies other components that are associated with Point A. Point A social context 406 includes six components 414 coupled to each other and coupled to Point A as shown by the interconnecting links between the components and Point A. These interconnecting links represent relationships between components. As mentioned above, these relationships can be identified using organizational charts, mailing lists, and the like. As shown in FIG. 4, certain components 414 in social context 406 are directly connected to one another or directly connected to Point A, while other components are coupled to other components or to Point A via one or more intermediate components.

Point B has an associated social context identified by broken line 410. This social context identifies other components that are associated with Point B. Point B social context 410 includes five components coupled to each other and coupled to Point B as shown by the interconnecting links between the components and Point B. As discussed above, these interconnecting links represent relationships between components and may be identified using organizational charts, mailing lists, and the like. Similar to social context 406, certain components in social context 410 are directly connected to one another or directly connected to Point B, while other components are coupled to other components or to Point B via one or more intermediate components.

A third social context is identified by broken line 408. Social context 408 may also be referred to as an overlapping social context. Social context 408 includes a component 412 that is common to both Point A and Point B. Social context 408 also includes seven other components coupled to one another by the interconnecting links between the components. As discussed above, these interconnecting links represent relationships between components. Similar to social contexts 406 and 410, certain components in social context 408 are directly connected to one another, while other components are coupled to other components via one or more intermediate components.

As shown in FIG. 4, a strong relationship between Point A and Point B exists in component 412. This relationship is defined by a link 416 between Point A and component 412 as well as a link 418 between component 412 and Point B. In this example, component 412 is the strongest relationship between Point A and Point B because this single component 412 is related to both Point A and Point B. Although other components have links to Point A or to Point B, no other component has a direct link to Point A and Point B. For example, a link 422 connects component 420 with a component in social context 406. However, component 420 does not have a direct link to Point A or Point B. Therefore, component 420 is not part of the strongest relationship between Point A and Point B. Similarly, a link 426 connects component 424 with a component in social context 408. However, component 424 does not have a direct link to Point A or Point B. Therefore, component 424 is not part of the strongest relationship between Point A and Point B.

As shown in FIG. 4, each social context is labeled to allow viewers to understand the common feature(s) of the social context (i.e., how the components in that social context are related). For example, social context 406 is labeled "Group 1", indicating that the components in social context 406 are related to one another due to their common group membership (i.e., Group 1). Similarly, social context 408 is labeled "Group 2" and social context 410 is labeled "Group 3". Use of such labels is optional. In alternate embodiments, additional information about the associated group (or other common feature) is displayed in the vicinity of the social context. If components in a particular social context have multiple common features, information regarding all of the common features is displayed. In alternate embodiments, only information regarding the strongest common feature is displayed. For example, the strongest common feature may be the smallest mailing list or group list that contains most of the components in the social context.

In this example, if component 412 is a person, Point A and Point B are related to one another via this person. Alternatively, if component 412 is a group or a department, Point A and Point B are related to one another via this group or department. Additionally, other components in social context 408 are shown in FIG. 4, thereby providing information regarding the relationship of component 412 with other components in social context 408.

The appearance of links and components in FIG. 4 can vary to identify certain characteristics or other information associated with the links and components. For example, links associated with a strongest relationship between two end points may be identified using a different color, different type of line (e.g., broken instead of solid), or a different line weight or line thickness. This modification of the appearance of a link is generally referred to as "highlighting" the link. In the example of FIG. 4, links 416 and 418 are shown with a thicker line than the other links, thereby signifying that those links are associated with the strongest relationship between Point A and Point B. In other embodiments, different line colors are used to identify different types of relationships between components.

FIG. 4 represents one example arrangement of components and links between two endpoints. Alternate embodiments may include additional components or links, may delete one or more components or links, or may include additional types of information or other data. For example, names (e.g., a person's name or a group's name) may be displayed adjacent one or more components in the graphical display. Further, any number of social contexts may be displayed along with any number of end points. In a particular embodiment, social contexts 406, 408 and 410 each represent a group, project, or department.

In one embodiment, the arrangement of components and links in a graphical display is influenced by the strength of the relationship between various components. For example, if two components are closely related, the link between the two components may be shorter or may be highlighted to indicate a strong link. Similarly, if two components are not closely related (e.g., the relationship is based on membership in a common group that has many members), the link between the two components may be longer to indicate a weaker link.

Figure 5:
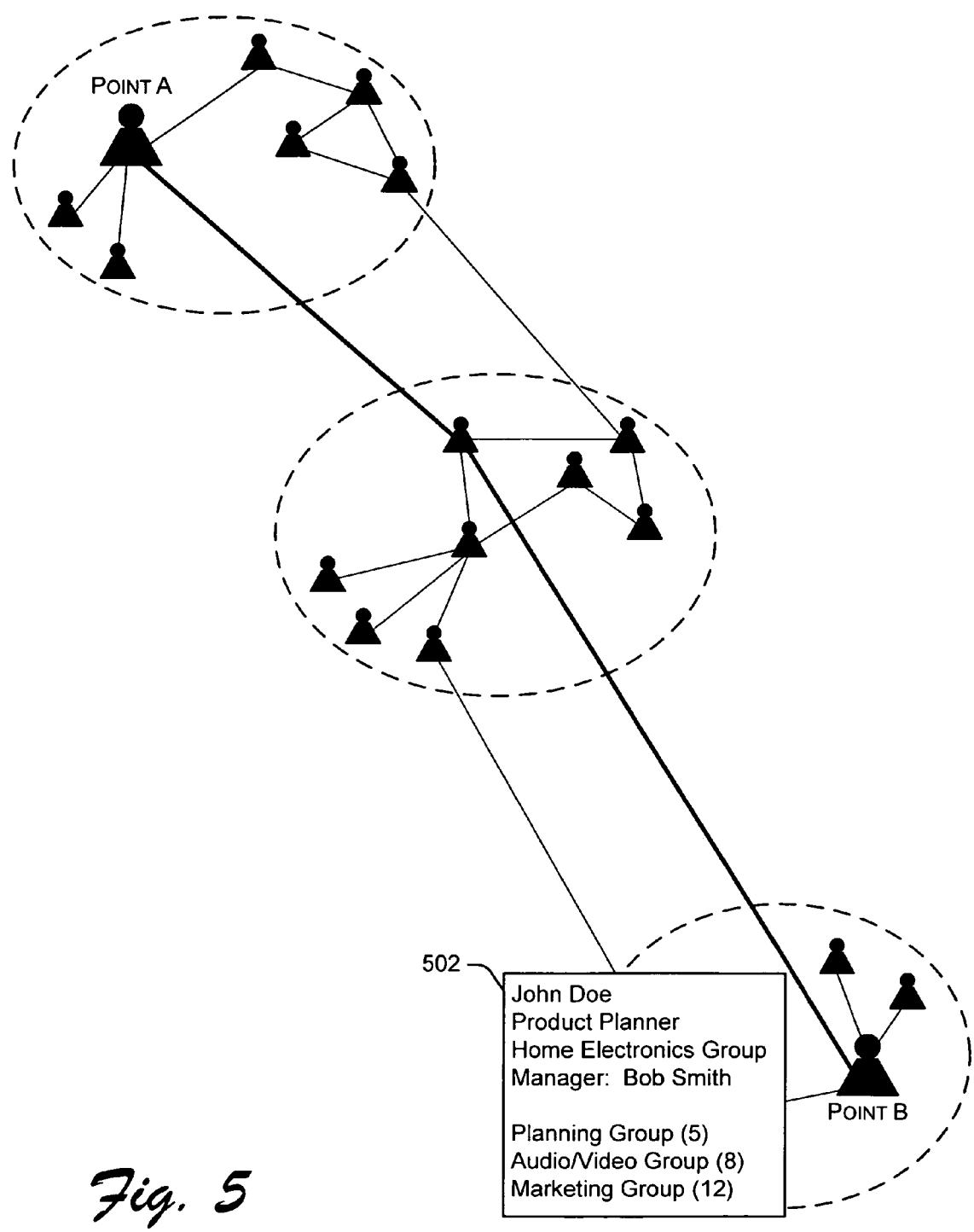
FIG. 5 illustrates the example graphical display of FIG. 4 with additional information displayed regarding a particular point in the social environment.

FIG. 5 illustrates the example graphical display of FIG. 4 with additional information displayed regarding a particular point in the social environment. The additional information is related to Point B and is shown in box 502. This additional information is shown when a user identifies Point B (e.g., by mousing over the Point B component in the display). In the example of FIG. 5, the additional information in box 502 is displayed temporarily (e.g., for a particular period of time or for as long as the user continues to identify Point B). In this example, Point B is a person and box 502 contains information about that person, such as their job title, organizational grouping and manager. Box 502 also lists several groups that the person is associated with, such as a planning group, an audio/video group and a marketing group. The numbers in parenthesis after each group name represent the number of people in that particular group. In this example, the groups are sorted by the number of people in the group in increasing order. Alternatively, information contained in box 502 may be arranged in any order. Further, the amount of information displayed in box 502 may be limited or truncated to fit within a predetermined size associated with box 502.

In other embodiments, other group-related data can be displayed such as a group membership roster, an owner of the group, permissions required to access the group, a most senior person in the group, how often the group is accessed by users, the age of the group, the type of group (e.g., social or business), and the primary constituents of the group (e.g., developers, managers, or salespeople). In alternate embodiments, when a user identifies a different component or a link between components, a box similar to box 502 is displayed that contains additional information related to the identified component or link. For example, if a link is identified, the box may contain information regarding groups or mailing lists that are common to the components at opposite ends of the link.

Figure 6:
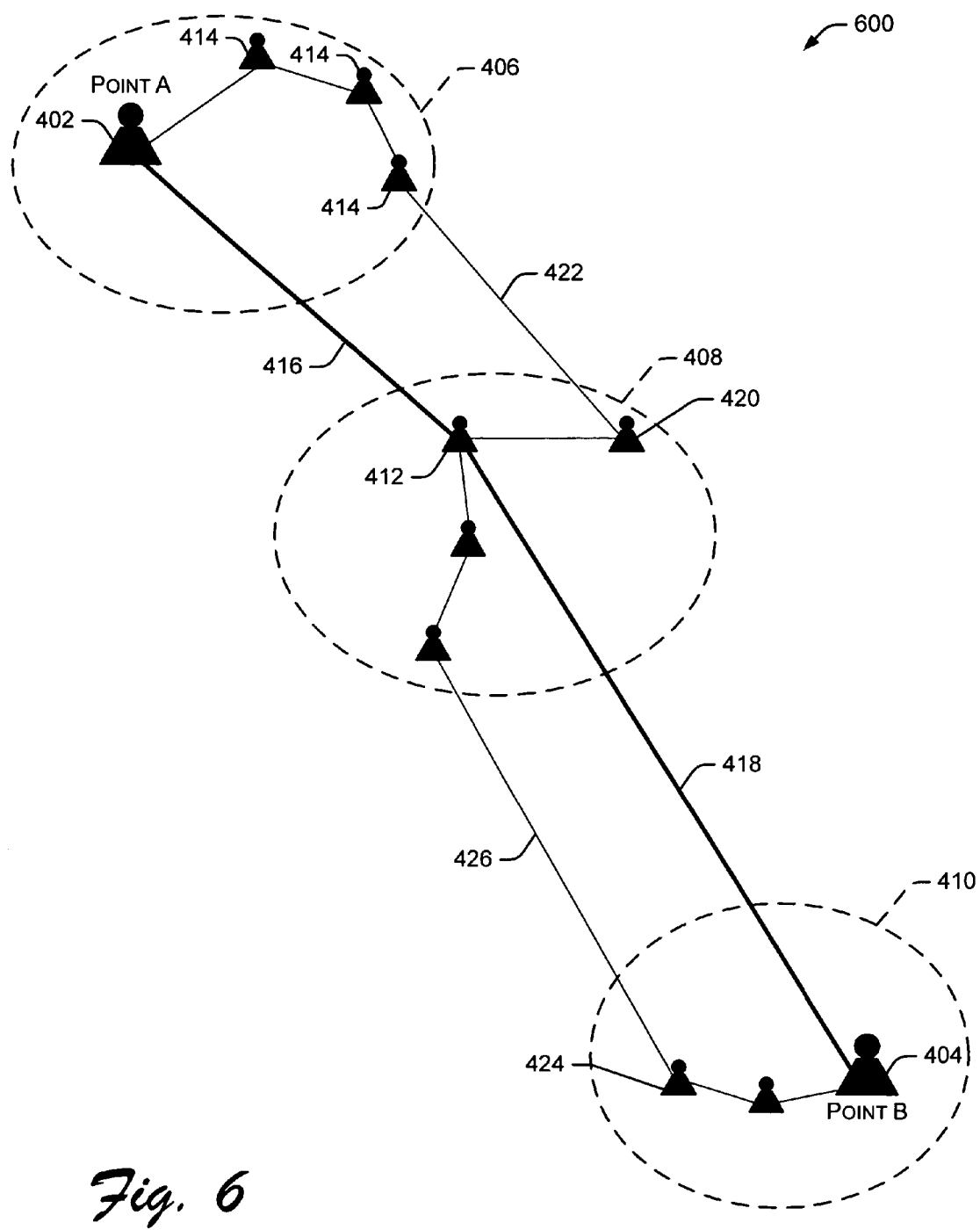
FIG. 6 illustrates another example graphical display of information related to multiple points in a social environment.

FIG. 6 illustrates another example graphical display 600 of information related to multiple points in a social environment. In this example, components that are not on a path that couples Point A to Point B are not displayed. Thus, components that are not coupled (either directly or indirectly) to Point A and to Point B are not displayed. Graphical display 600 provides a simplified display of information (as compared to the example of FIG. 4) by removing components that are not contained in a path that relates Point A to Point B.

Figure 7:
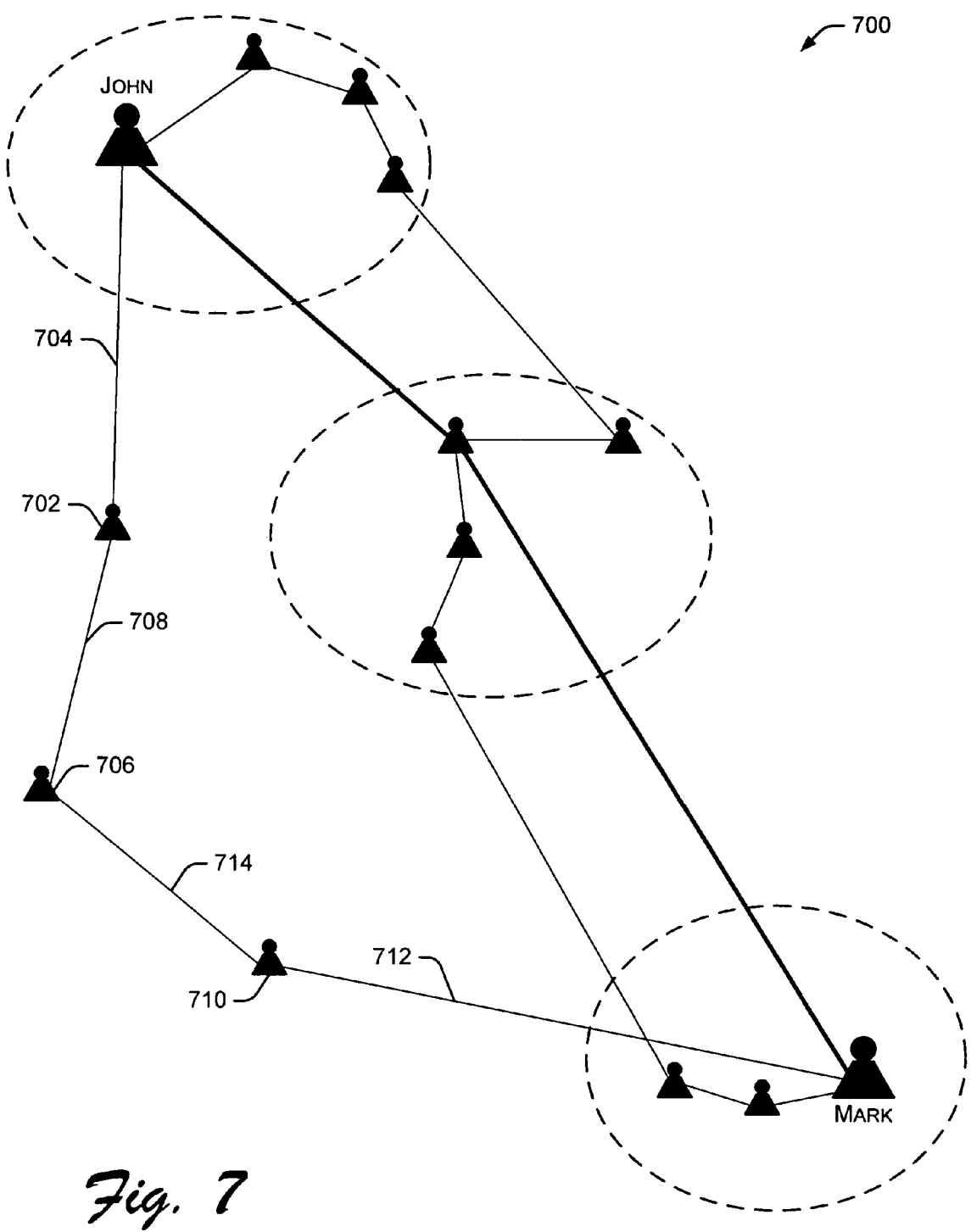
FIG. 7 illustrates another example graphical display of information related to multiple points in a social environment.

FIG. 7 illustrates another example graphical display 700 of information related to two people (John and Mark) in a social environment. In this example, additional information is displayed regarding the management chain associated with the two people. John is associated with his manager 702, illustrated by a link 704. John's manager 702 is associated with their manager 708, illustrated by a link 708. Similarly, Mark is associated with his manager 710, illustrated by a link 712. Mark's manager 710 is associated with manager 706, illustrated by a link 714. Thus, FIG. 7 illustrates management relationships as well as other social relationships between two people. In alternate embodiments, other information, relationships, and the like are displayed regarding two or more components in a social environment.

Particular examples discussed herein illustrate paths between two end points having two links—one link from a first end point to a common component and a second link from the common component to a second end point. In many situations, the shortest path (i.e., the fewest links and/or the fewest intermediate components) is the most meaningful relationship. However, in alternate embodiments, paths may contain any number of links (and any number of intermediate components) between two end points. For example, other criteria (such as persons in a particular group or persons that are managers) may be more important than the number of intermediate components.

Figure 8:
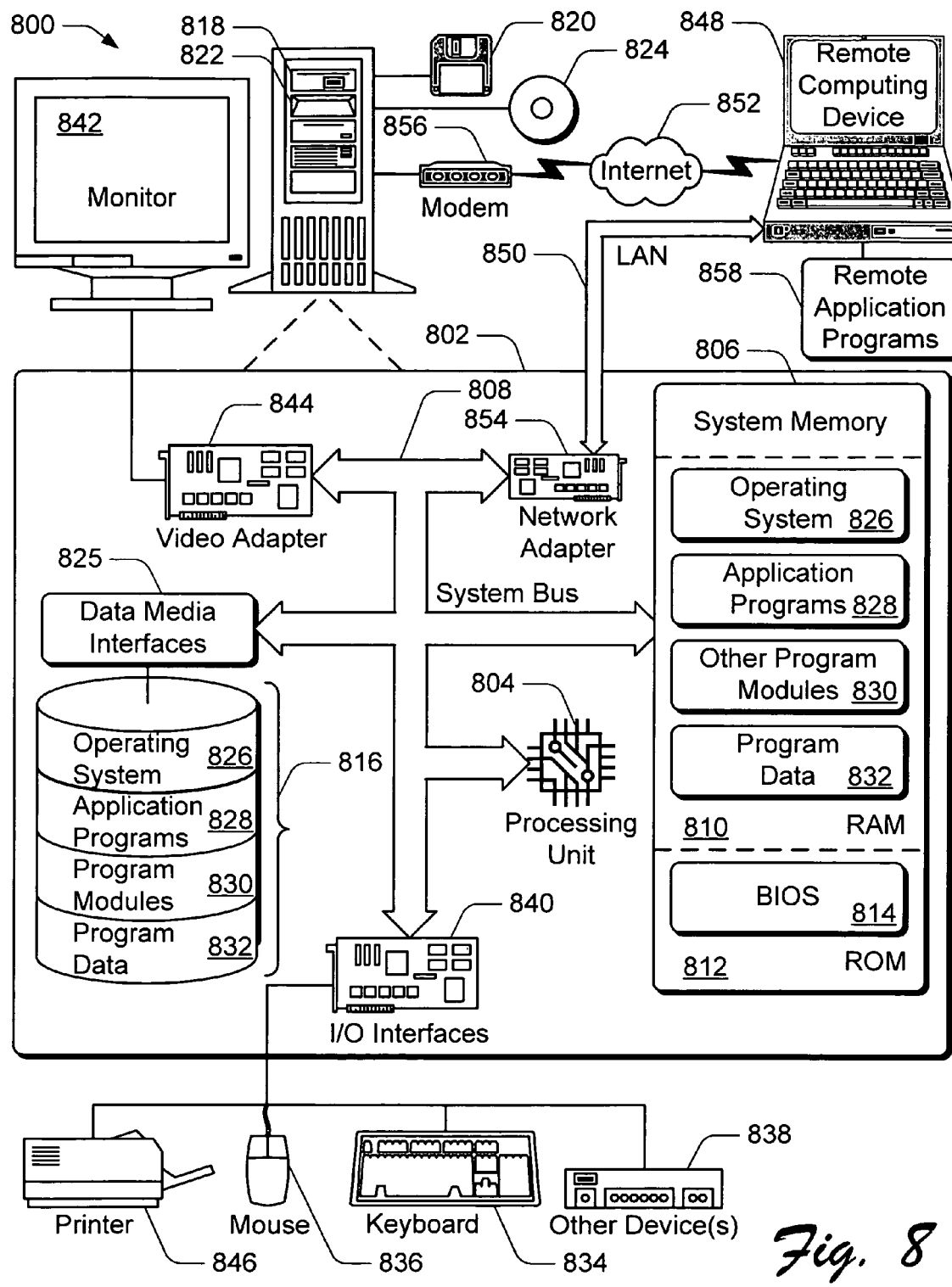
FIG. 8 illustrates a general computer environment, which can be used to implement the techniques described herein.

FIG. 8 illustrates a general computer environment 800, which can be used to implement the techniques described herein. The computer environment 800 is only one example of a computing environment and is not intended to suggest any limitation as to the scope of use or functionality of the computer and network architectures. Neither should the computer environment 800 be interpreted as having any dependency or requirement relating to any one or combination of components illustrated in the example computer environment 800.

Computer environment 800 includes a general-purpose computing device in the form of a computer 802. The components of computer 802 can include, but are not limited to, one or more processors or processing units 804 (optionally including a cryptographic processor or co-processor), a system memory 806, and a system bus 808 that couples various system components including the processor 804 to the system memory 806.

The system bus 808 represents one or more of any of several types of bus structures, including a memory bus or memory controller, a point-to-point connection, a switching fabric, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 802 typically includes a variety of computer readable media. Such media can be any available media that is accessible by computer 802 and includes both volatile and non-volatile media, removable and non-removable media.

The system memory 806 includes computer readable media in the form of volatile memory, such as random access memory (RAM) 810, and/or non-volatile memory, such as read only memory (ROM) 812. A basic input/output system (BIOS) 814, containing the basic routines that help to transfer information between elements within computer 802, such as during start-up, is stored in ROM 812. RAM 810 typically contains data and/or program modules that are immediately accessible to and/or presently operated on by the processing unit 804.

Computer 802 may also include other removable/non-removable, volatile/non-volatile computer storage media. By way of example, FIG. 8 illustrates a hard disk drive 816 for reading from and writing to a non-removable, non-volatile magnetic media (not shown), a magnetic disk drive 818 for reading from and writing to a removable, non-volatile magnetic disk 820 (e.g., a "floppy disk"), and an optical disk drive 822 for reading from and/or writing to a removable, non-volatile optical disk 824 such as a CD-ROM, DVD-ROM, or other optical media. The hard disk drive 816, magnetic disk drive 818, and optical disk drive 822 are each connected to the system bus 808 by one or more data media interfaces 825. Alternatively, the hard disk drive 816, magnetic disk drive 818, and optical disk drive 822 can be connected to the system bus 808 by one or more interfaces (not shown).

The disk drives and their associated computer-readable media provide non-volatile storage of computer readable instructions, data structures, program modules, and other data for computer 802. Although the example illustrates a hard disk 816, a removable magnetic disk 820, and a removable optical disk 824, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the example computing system and environment.

Any number of program modules can be stored on the hard disk 816, magnetic disk 820, optical disk 824, ROM 812, and/or RAM 810, including by way of example, an operating system 826, one or more application programs 828, other program modules 830, and program data 832. Each of such operating system 826, one or more application programs 828, other program modules 830, and program data 832 (or some combination thereof) may implement all or part of the resident components that support the distributed file system.

A user can enter commands and information into computer 802 via input devices such as a keyboard 834 and a pointing device 836 (e.g., a "mouse"). Other input devices 838 (not shown specifically) may include a microphone, joystick, game pad, satellite dish, serial port, scanner, and/or the like. These and other input devices are connected to the processing unit 804 via input/output interfaces 840 that are coupled to the system bus 808, but may be connected by other interface and bus structures, such as a parallel port, game port, or a universal serial bus (USB).

A monitor 842 or other type of display device can also be connected to the system bus 808 via an interface, such as a video adapter 844. In addition to the monitor 842, other output peripheral devices can include components such as speakers (not shown) and a printer 846 which can be connected to computer 802 via the input/output interfaces 840.

Computer 802 can operate in a networked environment using logical connections to one or more remote computers, such as a remote computing device 848. By way of example, the remote computing device 848 can be a personal computer, portable computer, a server, a router, a network computer, a peer device or other common network node, game console, and the like. The remote computing device 848 is illustrated as a portable computer that can include many or all of the elements and features described herein relative to computer 802.

Logical connections between computer 802 and the remote computer 848 are depicted as a local area network (LAN) 850 and a general wide area network (WAN) 852. Such networking environments are commonplace in offices, enterprise-wide computer networks, intranets, and the Internet.

When implemented in a LAN networking environment, the computer 802 is connected to a local network 850 via a network interface or adapter 854. When implemented in a WAN networking environment, the computer 802 typically includes a modem 856 or other means for establishing communications over the wide network 852. The modem 856, which can be internal or external to computer 802, can be connected to the system bus 808 via the input/output interfaces 840 or other appropriate mechanisms. It is to be appreciated that the illustrated network connections are exemplary and that other means of establishing communication link(s) between the computers 802 and 848 can be employed.

In a networked environment, such as that illustrated with computing environment 800, program modules depicted relative to the computer 802, or portions thereof, may be stored in a remote memory storage device. By way of example, remote application programs 858 reside on a memory device of remote computer 848. For purposes of illustration, application programs and other executable program components such as the operating system are illustrated herein as discrete blocks, although it is recognized that such programs and components reside at various times in different storage components of the computing device 802, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media." "Computer storage media" includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A computer implemented method comprising:
   identifying components associated with a first end point in an environment;
   identifying components associated with a second end point in the environment;
   determining whether any of the identified components are associated with both the first end point and the second end point;
   determining a path strength for each path between the first end point and the second point;
   identifying relationships between the first end point, the second end point, and any components associated with both the first end point and the second end point;
   displaying the relationships by, in part, displaying a social context associated with the first end point and a second context associated with the second end point; and
   displaying associated information in response to a user's identification of either the first end point or the second end point;
   displaying a common component associated with the first end point and the second end point;
   displaying at least one link between the common component and the first end point; and
   displaying at least one link between the common component and the second end point.

2. A method as recited in claim 1 wherein the environment is a social environment.

3. A method as recited in claim 1 further comprising receiving a request to identify relationships between the first end point and the second end point.

4. A method as recited in claim 1 wherein determining whether any of the identified components are associated with both the first end point and the second end point includes:
   ranking the paths between the first end point and the second end point based on the path strength.

5. A method as recited in claim 4 further comprising ignoring paths having a path strength below a predetermined threshold.

6. A method as recited in claim 4 wherein identifying relationships includes identifying only the top ranked paths between the first end point and the second end point.

7. A method as recited in claim 1 wherein displaying the relationships includes displaying information regarding at least one component.

8. A method as recited in claim 1 wherein displaying the relationships includes displaying information regarding at least one link between components.

9. A method as recited in claim 1 wherein displaying the relationships includes:
   displaying the first end point;
   displaying the second end point; and
   displaying at least one common component associated with the first end point and the second end point.

10. A method as recited in claim 1 further comprising:
    displaying the first end point;
    displaying the second end point;
    displaying components associated with the first end point; and
    displaying components associated with the second end point.

11. One or more computer-readable storage memories containing a computer program that is executable by a processor to perform the method recited in claim 1.

12. A method as recited in claim 1, wherein the path strength is based at least in part on one or more link strengths, wherein individual link strengths are associated with a link between one or both of:
    the first end point and an identified component associated with both the first end point and the second end point; or
    the second end point and an identified component associated with both the first end point and the second end point.

13. A method as recited in claim 1, wherein one or both of identifying components associated with a first end point in an environment and identifying components associated with a second end point in the environment are performed at last in part by analyzing an organizational chart.

14. A computer implemented method comprising:
displaying a first end point;
displaying components associated with the first end point;
displaying a second end point;
displaying components associated with the second end point;
displaying a common component associated with the first end point and the second end point;
displaying a link between the common component and the first end point;
displaying a link between the common component and the second end point;
determining a path strength associated with the common component by, at least in part;
determining a first link strength for the link between the common component and the first end point;
determining a second link strength for the link between the common component and the second end point; and
calculating the path strength between the first endpoint and the second endpoint based at least in part on multiplying the first link strength and the second link strength;
displaying a second common component associated with the first end point and the second end point;
displaying a link between the second common component and the first end point; and
displaying a link between the second common component and the second end point.

15. A method as recited in claim 14 further comprising:
preventing the display of the common component if the path strength is below a threshold.

16. A method as recited in claim 14 further comprising displaying a second link between the common component and the first end point.

17. A method as recited in claim 16 further comprising:
determining a strongest link between the common component and the first end point; and
highlighting the strongest link between the common component and the first end point.

18. A method as recited in claim 14 further comprising:
displaying a second link between the common component and the first endpoint; and
displaying a second link between the common component and the second end point.

19. One or more computer-readable memories containing a computer program that is executable by a processor to perform the method recited in claim 14.

20. One or more computer-readable storage media having stored thereon a computer program that, when executed by one or more processors, causes the one or more processors to:
display a first end point in a social network and a social context associated with the first end point;
display a second end point in a social network and a social context associated with the second end point;
identify a common component associated with the first end point and the second end point;
display the common component associated with the first end point and the second end point;
display a link between the common component and the first end point;
display a link between the common component and the second end point;
calculating the path strength between the first endpoint and the second endpoint based at least in part on multiplying the first link strength and the second link strength; and
displaying associate information in response to a user's identification of either a first end point or a second end point;
wherein the one or more processors further determine a path strength associated with the common component and prevent display of the common component if the path strength is below a threshold.

21. One or more computer-readable storage media as recited in claim 20 wherein the one or more processors further display a second link between the common component and the first end point.

22. One or more computer-readable storage media as recited in claim 20 wherein the one or more processors further display a second link between the common component and the first end point and display a second link between the common component and the second end point.

23. One or more computer-readable storage media as recited in claim 20 wherein the one or more processors further identify a second common component associated with the first end point and the second end point.

24. One or more computer-readable storage media as recited in claim 20 wherein the one or more processors further display the second common component associated with the first end point and the second end point.

* * * * *